May 24, 1966  M. J. WEITZMAN ETAL  3,252,611
WEATHERPROOF ELECTRICAL OUTLET BOX COVER
Filed June 17, 1964  2 Sheets-Sheet 1
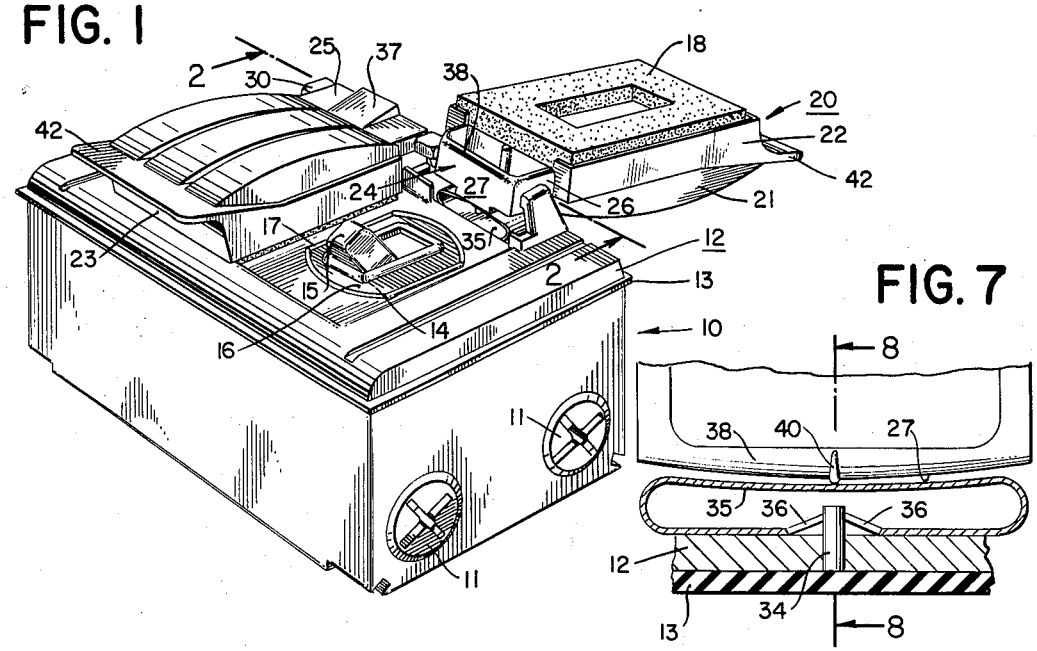
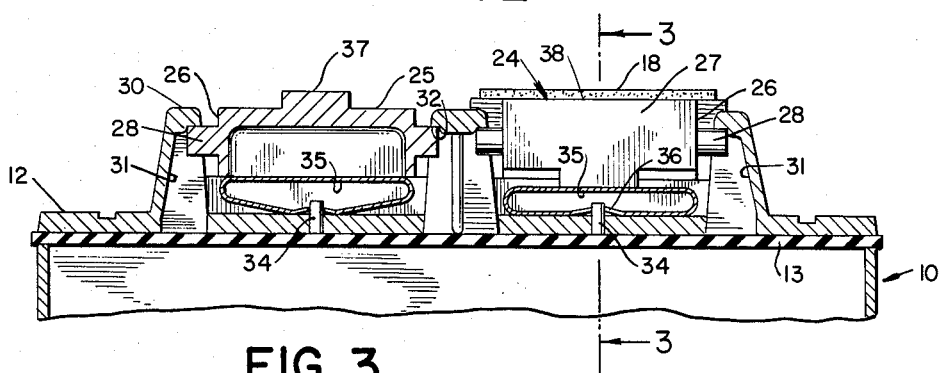
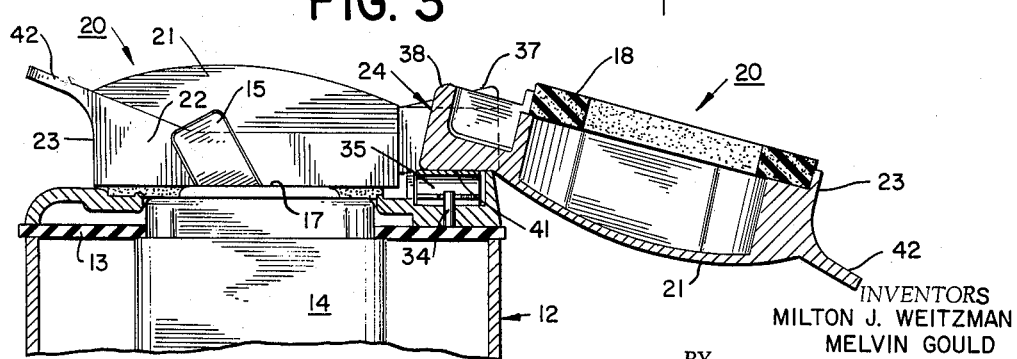
INVENTORS
MILTON J. WEITZMAN
MELVIN GOULD
BY
Darby & Darby
ATTORNEYS May 24, 1966    M. J. WEITZMAN ETAL    3,252,611
WEATHERPROOF ELECTRICAL OUTLET BOX COVER
Filed June 17, 1964    2 Sheets-Sheet 2
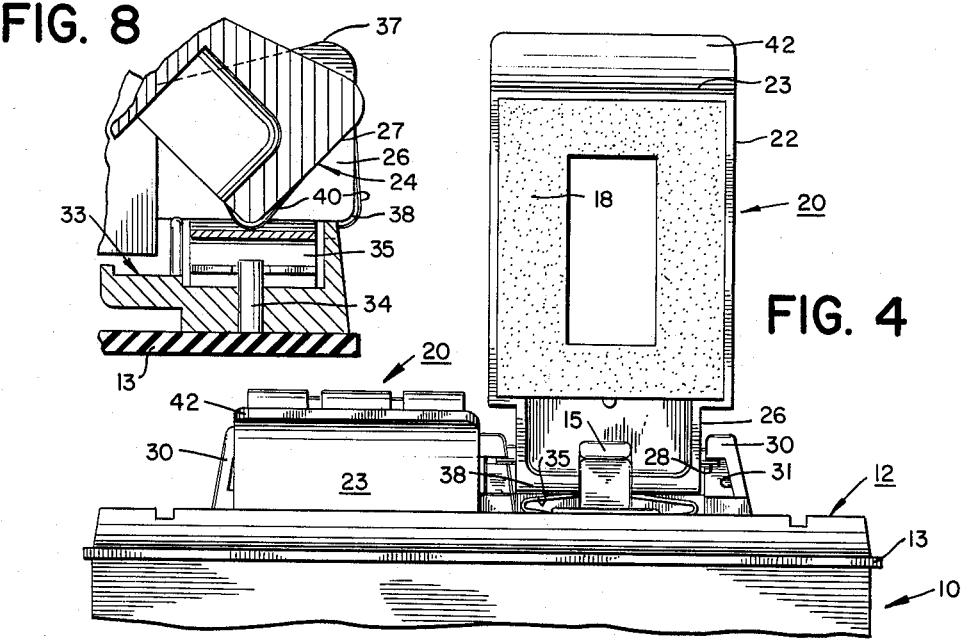
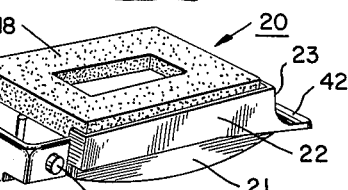
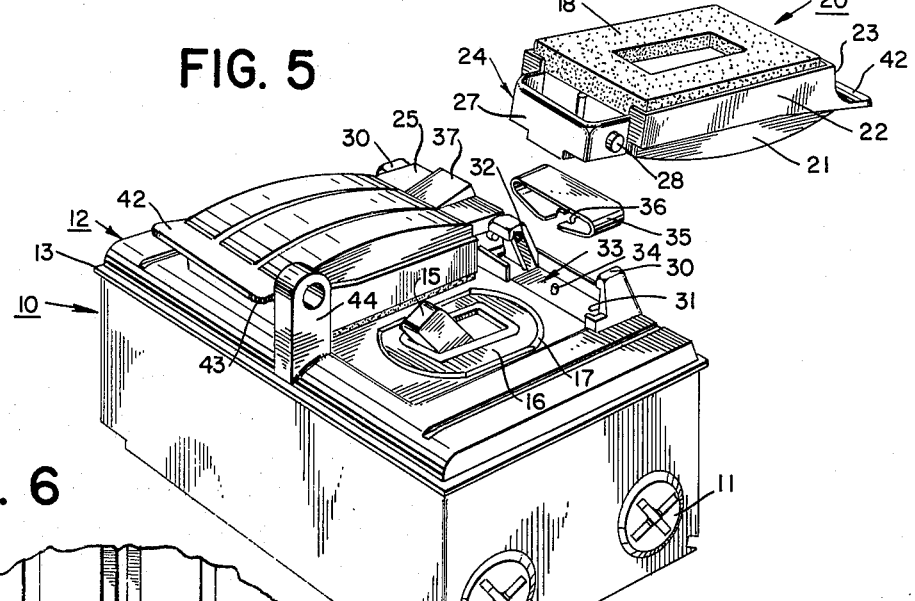
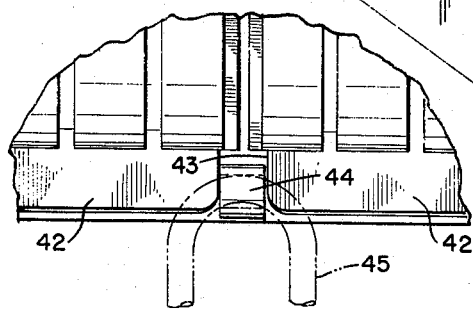
INVENTORS
MILTON J. WEITZMAN
MELVIN GOULD
BY
ATTORNEYS United States Patent Office 3,252,611
Patented May 24, 1966

3,252,611
WEATHERPROOF ELECTRICAL OUTLET BOX COVER
Milton J. Weitzman, Bayside, and Melvin Gould, Laurelton, N.Y., assignors to Slater Electric Inc., Glen Cove, N.Y., a corporation of New York
Filed June 17, 1964, Ser. No. 375,790
11 Claims. (Cl. 220—24.3)

The present invention relates to electrical outlet box covers and particularly to a cover for an electrical outlet box of the type in which each opening in the cover-plate has an individual cover mounted thereon so that when the electrical wiring device which is mounted in the box is not in use it is protected from the weather.

More particularly the outlet box cover of the present invention is provided with covers for the wiring devices which covers may be pivoted through an angle of substantially 180° so that when the wiring device is in use the cover will not be in a position to interfere with the cord of an appliance plugged therein or make it difficult to reach that plug or a switch mounted in the box.

Additionally, the weatherproof outlet of the present invention has the covers mounted on the cover plate in such manner that they may be removed when this is desirable and additionally the assembly operation is made very simple and the cost of the item thus materially reduced.

It is an object of the invention to provide a weatherproof outlet box cover comprising a cover plate and one or more covers pivotally mounted thereon which covers seal the electrical wiring device, a portion of which extends through the cover plate, against weather.

It is a further object of the invention to provide a weatherproof outlet box cover wherein the covers are pivotally mounted on the cover plate in such manner that they may pivot through an arc of substantially 180° and may be resiliently held in the closed position, a 90° position, or the 180° position.

It is another object of the invention to provide such a weatherproof outlet box cover in which the cover or covers proper may be readily removed from the cover plate and in which the assembly of the resilient means is extremely simple.

It is a still further object of the invention to provide a simple means by which the covers may be locked in closed position to prevent unauthorized usage of the wiring devices, such as switches and outlets, present in the outlet box.

Other objects and features of the invention will be apparent when the following description is considered in connection with the annexed drawings, in which, FIGURE 1 is a perspective view of an outlet box showing the weatherproof cover of our invention mounted thereon;

FIGURE 2 is a vertical cross-sectional view taken on the plane of the line 2—2 of FIGURE 1 showing particularly the mode of hinging the covers to the cover plate;

FIGURE 3 is a cross-sectional view taken at right angles to the view of FIGURE 2 and specifically along the plane of the line 3—3 of FIGURE 2 showing additional details of the mounting and illustrating the construction of the covers proper;

FIGURE 4 is a front elevational view of the device showing the mounting of the covers on the cover plate. This view shows one of the covers in its closed position and a second cover in the 90° position;

FIGURE 5 is a perspective view similar to FIGURE 1 showing one of the two covers in an exploded manner illustrating the mode of assembly of the covers to the cover plate;

FIGURE 6 is a fragmentary view of a portion of the cover plate and covers illustrating the mode of locking the covers in their closed position;

FIGURE 7 is an enlarged fragmentary view of the resilient means which holds the cover in one of its adjusted positions, this view also including a showing of the portion of the cover plate which cooperates with the resilient means; and FIGURE 8 is a fragmentary cross-sectional view taken on the plane of the line 8—8 of FIGURE 7 and further illustrating the construction of the outlet or switch cover and particularly of the portion of that cover which is acted upon by the resilient member to hold the cover in an adjusted position. This view shows one of the two covers in its closed position and the second cover in position intermediate its closed position and its 90° position.

Referring now to the drawings and particularly to FIGURE 1 thereof, there is shown at 10 the ordinary weatherproof outlet box which is customarily a die casting and fitted with screw plugs such as 11 so that the conduit may be fixed to the box without permitting moisture to enter the box. The weatherproof cover plate of our invention is indicated generally at 12 and is, as is customary, fixed to the box by means of a screw, a rubber gasket 13 being placed between the lower surface of the cover plate 12 and the upper edges of the side and end walls of box 10.

Also in the usual manner the plate 12 is provided with apertures 14 which accommodate the outwardly protruding portions of electrical wiring devices such as outlets or switches. In the particular instance illustrated the protruding portion is that of a switch and includes the switch handle 15. The apertures 14 are formed in a depressed central area 16 of the plate 12 and are provided with rims 17 which cooperate with gaskets 18 fixed in the switch covers 20.

The covers 20 are generally rectangular in shape and comprise an arched top wall 21 and depending side and end walls 22 and 23 respectively (FIGS. 1 and 3). In addition, each cover plate 20 has a rearward extension 24 somewhat less in width than the width of the cover proper, this extension comprising a top wall 25, side walls 26 and an end wall 27. Integral with each side wall 26 is a laterally extending pin 28 which, as will appear, serves as a pivot pin for the respective cover.

Made integrally with the cover plate 12 are two pairs of upstanding ears 30. Each of these ears is in the form of a channel, the open sides of the channel of a pair of ears facing each other. Each ear 30 is closed at its end as indicated at 31, the end wall having a semicylindrical groove 32 therein with the open side facing the plate 12, these grooves mating with respective pins 28 and serving as journals for those pins. The ears 30 are also provided with rectangular cutuots in the forward one of the sides of the journal, these cutouts being provided in order that the covers may readily be assembled to the cover plate in a manner shortly to be described.

It should be noted at this point that although the ears 30 were described as being four in number there are in fact but three ears, the central one serving as the second one of the pair for both covers and being open on the side rather than of channel formation.

Extending between each outer ear and the central ear is an area 33 of the base which is slightly depressed below the area 16 there being an upstanding pin 34 located centrally of this area (see FIGURE 5).

A spring 35 (see FIGURE 2) is placed in this area, the spring being a flat resilient member bent into the general form of a triangle with its apex facing downwardly. The ends of the spring form the apex and the ends thereof are notched at points 36 as shown particularly in FIG-5. These notches 36 form a circular opening which surrounds the upstanding pin 34, thus locating the spring.

As will be readily apparent from the above description, the covers are assembled to the plate by first inserting springs 35 into the depressions 33 with their bases facing outwardly, thereupon forcing the spring downwardly by placing the end wall 27 of the cover plate extension against the spring, the spring being depressed until it is possible to move the cover 20 inwardly so that the pins 28 pass through the notches in the forward channel walls of the ears 30. Once the pins have passed through these notches the spring forces the pins 28 into engagement with the semicircular grooves 32 so that the cover is pivotally mounted as described above.

The spring 35 cooperates with the extension 24 of the cover 20 to hold the cover in one of three predetermined positions, namely, the closed postion, an open position at which the cover extends at right angles to the cover plate 12, and a fully open position at which the cover is rotated through somewhat more than 180° from its closed position and into the position shown for the right hand cover in FIGURE 1.

In order to assure that the spring will exert the desired degree of force upon the cover to hold it in one of these positions, the top 25 of the extension 24 is provided with an upwardly extending sloped area 37 and, in addition, the lower edge 38 is provided with a small rib 40, see FIGS. 1, 2 and 7. Moreover, the pins 28 are not on the center line of the side walls 26 of the extension 24, but are spaced closer to the end wall 27 than to the bottom edge 38 and slightly closer to the surface of the projection 37 than to the edge 38.

When the cover is in its closed position, or when, passing from its closed position to its 45° position, the rib 40 causes the spring to flex at its center as well as to bend at its corners into the shape shown particularly in FIGURE 7. As a result the spring exerts its greatest force at this time and thus assures that the cover be held in its closed position with a considerable amount of force. As the cover passes into its 90° position the spring is no longer flexed centrally by the rib 40, but rests against the flat surface of the end wall 27 as shown in FIGURE 4. The spring then exerts a lesser force upon the cover to hold it in the 90° position both because the distance from the pins to the end wall is less and because the rib is no longer effective.

Although this same effect of greater force in the closed position could be achieved by making the edge 38 in a manner to space it from the pins the same distance as the top of the rib 40, this would cause the spring to flex only at the corners and would tend to result in breakage of the spring. The use of the rib 40 thus assures that the cover will be solidly held in its closed position without increasing the likelihood that the spring 35 will fatigue at the corners.

By making the top wall 25 of the extension 24 with the projecting portion 37 and particularly by making that projecting portion sloped as seen particularly at 41 in FIGURE 3, the cover is caused in its fully open position to have been rotated slightly more than 180° from its closed position.

Also, since the width of the area 37 is quite great the spring remains with its top portion in substantially a straight line. Moreover, since the distance from the center of pins 28 to the sloped surface of the projection 37 is somewhat less than the distance from the pin center to the edge 38 the cover is not held in its fully open position with the same degree of force as in its closed position and since this is true it is not necessary to utilize a narrow rib such as the rib 40 to cause the spring 35 to flex along the length of its upper portion.

As will be seen from the above, the extension 24 of the cover is carefully designed to provide a varying spring pressure to hold the cover in its three adjusted positions, while at the same time limiting the likelihood that the spring will fatigue and break. Moreover, due to the use of the three surfaces of the cover extension as a bearing surface for the spring 35, the cover cannot be left in any position intermediate the predetermined ones, since when the cover, for example, passes from its 45° position the spring immediately urges it to its 90° position and likewise when the cover has passed just beyond the 135° position the cover is immediately urged into its fully open position. Conversely, of course, as the cover is being closed when it passes beyond the 135° position the spring 35 immediately moves it to the 90° position and when moved beyond the 45° position urges it to its fully closed position.

In order to facilitate the operation of the covers they are provided with a forwardly extending lip 42 which may readily be gripped by the fingers. Additionally, in order to lock the covers in place and thus deny access to the wiring devices to unauthorized persons, the lips 42 of the covers 20 may be notched out at 43 as shown in FIGURE 5. This permits a post 44, integral with the cover plate 12, to extend upwardly between the lips 43. This post is provided with a hole extending therethrough which can accommodate the hasp of a padlock which will then lie above the lips 43 when the covers are in their closed position and will effectively prevent the opening of those covers. Such a padlock hasp is indicated in dotted lines at 45 in FIGURE 6.

While we have described a preferred embodiment of the invention, it will be understood that we wish to be limited not by the foregoing description, but solely by the claims granted to us.

What is claimed is:

1. In a weatherproof cover for an electrical outlet box and a wiring device mounted therein of the type having a plate adapted to be fixed to the box covering the open side thereof, having an opening therein through which the wiring device extends and having at least one cover mounted on the plate and extending over the opening and device in one position thereof; the improvement comprising a pair of spaced apart outwardly extending ears on said plate, said ears being formed as channels with the open sides facing each other, said channels having closed ends remote from said plate, said closed ends having grooves in their inner surfaces, and having notches in the forward legs of the channels, a cover extension having rear, top, side and bottom wall portions, said side wall portions being spaced apart to fit between said ears, a pin on each said side wall portion, said pins being adapted to enter said ears through said notches and to be journalled in said grooves, and a resilient member seated beneath said cover extension between said ears, said resilient member holding said pins in said grooves and bearing alternatively against said top, rear and side wall portions to hold said cover in one of a number of predetermined adjusted positions relative to the cover plate.

2. A device as claimed in claim 1 wherein the cover plate has a depressed central area extending forwardly from adjacent said ears to a line adjacent the forward edge of the plate and wherein the wiring device openings are surrounded by raised rims and said covers overlie substantially all of said depressed plate area.

3. A device as claimed in claim 1 wherein said resilient means comprises a leaf spring bent into a generally triangular shape, the base of said triangular spring bearing against one of said rear, top and side wall portions of said cover extension in each position of said cover and the apex ends of said spring bearing against said plate substantially centrally of the space between the corresponding ears to thereby maintain said cover in a selected one of said cover positions.

4. A device as claimed in claim 3 wherein the area between said ears is depressed relative to the remainder of said plate and the apex of said triangular spring seats centrally of said depressed area.

5. A device as claimed in claim 4 wherein said triangular spring has notches formed in said apex edges and wherein said depressed area is formed with an upstanding pin located substantially centrally thereof, said notches surrounding said pin and locating said spring.

6. A device as claimed in claim 1 wherein said rear, top and side wall portions are spaced at different distances from the common center line of said pins, whereby the pressure holding said cover in its three predetermined adjustable positions, is different.

7. A device as claimed in claim 1 wherein the edge between said rear and bottom side wall portions of said cover extensions is provided with a central rib extending transversely thereto, said rib causing said spring to flex along its base thereby increasing the pressure holding the cover in its closed position and correspondingly increasing the pressure urging said cover from its 45° position to its closed position and to its 90° position.

8. A device as claimed in claim 1 wherein said top wall portion of said cover extension has a raised central portion extending transversely to said top wall portion, said raised portion sloping upwardly from front to rear, said rib bearing against said spring when said cover is in fully open position, said raised portion serving to flex said spring at the corners to increase the pressure holding the cover in its fully open position, said slope causing said fully open position to exceed 180° relatively to the fully closed position.

9. In a weatherproof cover for an electrical outlet box and a wiring device mounted therein of the type having a plate adapted to be fixed to the box covering the open side thereof, having an opening therein through which the wiring device extends and having at least one cover mounted on the plate and extending over the opening and device in one position thereof; the improvement comprising a pair of spaced apart outwardly extending ears on said plate, said ears being formed as channels with the open sides facing each other, said channels having closed ends remote from said plate, said closed ends having grooves in their inner surfaces, and having notches in the forward legs of the channels, a cover extension having rear, top, side and bottom wall portions, said side wall portions being spaced apart to fit between said ears, a pin on each said side wall portion, said pins being adapted to enter said ears through said notches and to be journalled in said grooves, a resilient member comprising a leaf spring bent into a generally triangular shape, the base of said triangular spring member bearing against one of said rear, top and side wall portions of said cover extension and the apex ends of said spring bearing against said plate substantially centrally of the space between the corresponding ears, a depressed area between said upstanding ears, said depressed area serving to seat the apex of said triangular spring, said rear, top and side portions of said cover extension being spaced at different distances from the common center line of said pins whereby the cover is held in each one of a plurality of predetermined positions with a different pressure.

10. A device as claimed in claim 9 wherein the edge between said rear and bottom wall portions of said cover extension is provided with a central rib extending transversely thereto, said rib causing said triangular spring member to flex along its base to thereby increase the pressure holding said cover in its closed position and also correspondingly increasing the pressure urging said cover from its 45° position to either its 90° position or its closed position.

11. A device as claimed in claim 10 wherein said top wall portion of said cover extension has a raised central portion extending transversely to said top wall portion, said raised portion sloping upwardly from front to rear, said rib bearing against said spring when said cover is in fully open position, said portion serving to flex said spring at the corners to increase the pressure holding said cover in its fully open position, said slope causing said fully open position to exceed 180° relative to the fully closed position.

No references cited.

THERON E. CONDON, *Primary Examiner.*

J. B. MARBERT, *Assistant Examiner.*